(12) United States Patent
Do et al.

(10) Patent No.: US 10,568,017 B2
(45) Date of Patent: Feb. 18, 2020

(54) ENABLING WIRELESS SECURITY MEASURES BASED ON WIRELESS ACCESS POINT ATTRIBUTES

(71) Applicant: Avast Software s.r.o., Prague (CZ)

(72) Inventors: Juyong Do, Cupertino, CA (US);
Martin Horváth, Albany, CA (US)

(73) Assignee: Avast Software s.r.o., Prague (CZ)

( * ) Notice: Subject to any disclaimer, the term of this patent is extended or adjusted under 35 U.S.C. 154(b) by 0 days.

(21) Appl. No.: 16/370,831

(22) Filed: Mar. 29, 2019

(65) Prior Publication Data

US 2019/0306781 A1 Oct. 3, 2019

Related U.S. Application Data

(60) Provisional application No. 62/651,018, filed on Mar. 30, 2018.

(51) Int. Cl.
*H04W 48/04* (2009.01)
*H04W 12/00* (2009.01)

(52) U.S. Cl.
CPC ..... *H04W 48/04* (2013.01); *H04W 12/00503* (2019.01)

(58) Field of Classification Search
CPC ..... H04W 48/00; H04W 48/02; H04W 48/04; H04W 12/00; H04W 12/00503; H04W 40/20
See application file for complete search history.

(56) References Cited

U.S. PATENT DOCUMENTS

| | | | |
|---|---|---|---|
| 2008/0209521 A1 | 8/2008 | Malaney | |
| 2009/0088182 A1* | 4/2009 | Piersol | H04W 48/12 455/456.1 |
| 2010/0016022 A1* | 1/2010 | Liu | H04W 48/08 455/561 |
| 2010/0110921 A1* | 5/2010 | Famolari | H04W 48/17 370/252 |
| 2011/0093913 A1 | 4/2011 | Wolhert et al. | |
| 2013/0295962 A1* | 11/2013 | Manroa | H04W 76/10 455/456.3 |

(Continued)

OTHER PUBLICATIONS

International Search Report dated Jun. 21, 2019 for PCTUS/1925049.

*Primary Examiner* — Dinh Nguyen
(74) *Attorney, Agent, or Firm* — Dovas Law, P.C.

(57) ABSTRACT

A processor-implemented method including scanning wirelessly by a plurality of mobile devices and selecting a plurality of wireless access points based on the scanning by the plurality of mobile devices. Particular attributes of the plurality of wireless access points are determined, and the particular attributes of the plurality of wireless access points are compared. A particular set of the plurality of wireless access points are grouped based on the comparing of the particular attributes, and a particular geographic location is assigned to the particular set of the plurality of wireless access points. A particular security protocol is assigned to the particular geographic location based on the particular attributes of the particular set of the plurality of wireless access points. A particular mobile device is determined to be positioned within a particular distance of the particular geographic location, and wireless communication of the particular mobile device is restricted.

40 Claims, 6 Drawing Sheets

(56) References Cited

U.S. PATENT DOCUMENTS

| | | |
|---|---|---|
| 2013/0340039 A1 | 12/2013 | Malaney |
| 2014/0143629 A1 | 5/2014 | Hassan et al. |
| 2015/0063331 A1* | 3/2015 | Scahill ............... H04L 63/0892 370/338 |
| 2016/0323843 A1 | 11/2016 | Morgan et al. |

* cited by examiner

ENABLING WIRELESS SECURITY MEASURES BASED ON WIRELESS ACCESS POINT ATTRIBUTES

CROSS REFERENCE TO RELATED APPLICATION

This application claims the benefit of U.S. Provisional Patent Application No. 62/651,018, filed Mar. 30, 2018, which is incorporated by reference as if fully set forth.

FIELD OF INVENTION

The invention relates generally to computing device security, and more particularly to adaptive computing device security.

BACKGROUND

A point of interest ("PoI") represents a geographical location with personal importance to users in the field of location-enabled mobile computing. Identification of PoIs has become one of the pillars of the mobile communications experience. However, PoI identification (localization and characterization) is often challenging, taking significant time and resources which resources are often geographically dispersed.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A method is provided implemented by one or more processors, the method including scanning wirelessly by a plurality of mobile devices and selecting a plurality of wireless access points based on the scanning by the plurality of mobile devices. Particular attributes of the plurality of wireless access points are determined, and the particular attributes of the plurality of wireless access points are compared. A particular set of the plurality of wireless access points are grouped based on the comparing of the particular attributes, and a particular geographic location is assigned to the particular set of the plurality of wireless access points. A particular security protocol is assigned to the particular geographic location based on the particular attributes of the particular set of the plurality of wireless access points. A particular mobile device is determined to be positioned within a particular distance of the particular geographic location, and wireless communication of the particular mobile device is restricted based on the particular security protocol assigned to the particular geographic location.

Further provided is a method of implementing security protocols on a mobile communication device comprising designating a particular geographic area, scanning wirelessly by a plurality of mobile devices to locate a plurality of wireless access points in the particular geographic area, and determining a number of the plurality of mobile devices that connect to one or more of the plurality of wireless access points in the particular geographic area over a particular time period. Durations of time that the plurality of mobile devices connect to the one or more of the plurality of wireless access points in the particular geographic area over the particular time period are determined, and a particular geographic location in the particular geographic area is designated. A particular security protocol is assigned to the particular geographic location based on the durations of time the plurality of mobile devices connect to the one or more of the plurality of wireless access points in the particular geographic area and the number of the plurality of mobile devices that connect to the one or more of the plurality of wireless access points in the particular geographic area. The method further includes determining by a particular mobile device that the particular mobile device is located within a particular distance of the particular geographic location, and applying the particular security protocol by the particular mobile device based on the particular mobile device being located within the particular distance of the particular geographic location.

Further provided is a security system for a wireless network. The security system includes a plurality of mobile devices comprising processors and wireless hardware which enable a particular mobile device of the plurality of mobile devices to wirelessly scan to locate a plurality of wireless access points and determine particular attributes of the plurality of wireless access points, the particular attributes comprising service set identifiers ("SSIDs"), positions of the plurality of wireless access points, and security protocols of signals from the plurality of wireless access points. The particular mobile device is further enabled to determine a position of the particular mobile device, execute a particular authentication process on the particular mobile device to permit connection by the particular mobile device to a particular wireless access point based on a particular security protocol associated with the position of the particular mobile device, and transmit the particular attributes of the plurality of wireless access points. The security system further includes a server including one or more processing elements which enable the server to receive the particular attributes of the plurality of wireless access points from the plurality of mobile devices, compare the particular attributes of the plurality of wireless access points, group a particular set of the plurality of wireless access points based on the comparing of the particular attributes, assign a particular geographic location to the particular set of the plurality of wireless access points, and assign the particular security protocol to the particular geographic location based on the particular attributes of the particular set of the plurality of wireless access points.

BRIEF DESCRIPTION OF THE DRAWING(S)

A detailed understanding of illustrative embodiments may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein.

DETAILED DESCRIPTION OF ILLUSTRATIVE EMBODIMENT(S)

Figure 1:
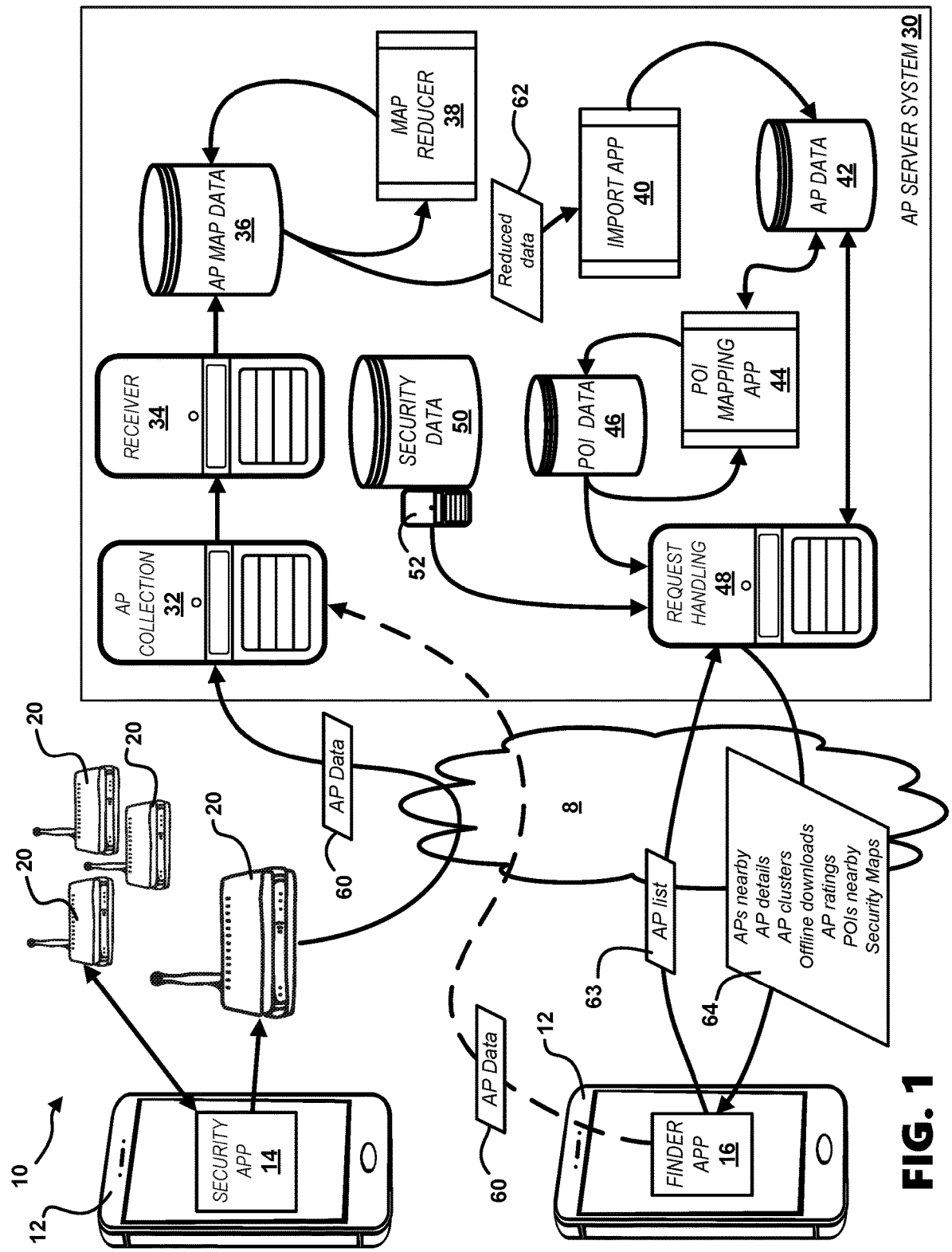
FIG. 1 is a diagram showing a system for point of interest ("PoI") identification and implementing electronic security measures based on wireless access point attributes.

Illustrative embodiments are described below with reference to the drawing figures wherein like numerals represent like elements throughout. The terms "a" and "an" as used herein do not denote a limitation of quantity, but rather denote the presence of at least one of the referenced items. Any directional signal such as top, bottom, left, right, upper and lower are taken with reference to the orientation in the various figures.

Referring to FIG. 1, a network system 10 is disclosed in which data from one or more datastores and existing attributes of particular wireless access points 20 are used to accelerate point of interest ("PoI") identification or rapidly generate a PoI, the PoI used in enabling security wireless security measures. An access point ("AP") 20 can for example implement a WiFi™ or other wireless protocol, and existing AP attributes can include for example a service set identifier ("SSID"), a number of connected devices, or other attribute set forth in Table 1 below. The attributes are gathered for example by wireless mobile communication devices 12. AP SSIDs typically provide descriptive text regarding the nature of a particular location such as whether the particular location corresponds to a public place (e.g., school name, café name, airport name) or a private place (e.g., "home", "living room"). Moreover, the level of wireless activity (e.g., number of connected/visited devices) can indicate the nature of a particular location. For example if a number of devices connected to an AP 20 is greater than 50, this may suggest that the AP 20 is located in a public space like a mall (e.g., a "hotspot"), rather than a private place like a home.

TABLE 1

Stored AP Attributes

| ATTRIBUTE | DESCRIPTION |
| --- | --- |
| SSID | Service set identifier or network name provided by wireless access point ("AP"). For example, a WiFi ™ network name. |
| BSSID | Basic service set identification - MAC address (device ID) of wireless access point. |
| Security Type | Security protocol used to secure the communication between a device and wireless access point, for example WEP, WPA, WPA2. |
| Signal Strength | RSSI (received signal strength indicator), an indication of the power level being received by the antenna. |
| Location | User device location coordinates (GPS coordinates) where the AP was spotted, or AP location information acquired from AP. |
| Measured speed (download - upload) | When a user device is connected to the AP, the user device can measure the connection speed and/or ping for other user devices' quality of service ("QoS") information. |
| Date/time | When the AP was first spotted (i.e., first entry into datastore) |
| Password | A user can submit password to public APs (e.g., "hotspots") |
| Category | Open, open with ToA, paid, discontinued, mobile (e.g., on a train or bus). |

TABLE 1-continued

Stored AP Attributes

| ATTRIBUTE | DESCRIPTION |
| --- | --- |
| Terms of Agreement | For those hotspots for example in which a device application can automatically (on behalf of the user) accept the Terms of Agreement. |
| Comments | User comments. |
| Ratings | User ratings (e.g., thumbs up/down or star rating). |
| Number of daily users | Times that a user device successfully connected to the AP daily and durations of time the user device connected. |
| Security check date | When a security check was last performed. |
| Security check result | The result of the security check. |
| Internet availability | Full availability/partial availability/no availability and when the internet connection was checked last (e.g., a portscan). |

Mobile communication devices 12, for convenience of description termed the "user devices 12", operate in the network 8. Software and/or hardware residing on the user device 12 enables a security application 14 for device threat monitoring and/or a finder application for finding and logging wireless access points in range of the user device 12. The user device 12 can include for example a smart phone or other cellular enabled mobile device configured to operate on a wireless telecommunications network. Alternatively, the user device 12 can include a personal computer, tablet device, or other computing device including wireless transceiver and corresponding hardware and/or software to support wireless communications.

The user devices 12 scan for access points 20 (e.g., WiFi™ protocol access points) and gather attribute data from access points 20 which have been scanned or connected to by the user devices 12. An AP server system 30 aggregates the gathered AP attribute data 60 ("AP data") and distributes information including security settings determined based on the AP data 60 via the finder application 16. An AP collection server 32 receives AP data 60 from user devices 12 via the security application 14 and the finder application 16. A receiver server 34 gathers the collected AP data 60 and passes it to an AP map datastore 36 which can be implemented beneficially as a distributed file system, for example a Hadoop™ Distributed File System ("HDFS™"). A map reducer 38 performs reduction on the AP data 60, and reduced AP data 62 is imported via an import application 40 to an AP datastore 42. Beneficially, the AP datastore 42 can be configured as a PostgreSQL object-relational database management system with support for geographic objects provided by PostGIS™ application software. The AP datastore 42 stores reduced AP data 62 including data listed in Table 1. The AP datastore 42 can further store PoIs and corresponding attributes received via the user devices 12 or other data source.

A PoI mapping application 44 is configured to use data from the AP datastore 42 to generate PoIs with AP attributes (e.g., location, security type, category, ratings) without any predetermined or user-provided PoI. The PoI mapping application 44 is further configured to apply AP attributes to existing pre-determined PoIs ("seed PoIs") from the AP datastore 42. Determined and characterized PoIs and their AP attributes are stored in the PoI datastore 46. The PoI mapping application 44 is configured to cluster APs stored in the AP datastore 42 based on their geographical and attribute proximities. If a dominant AP group, for example a relatively large group of APs including similar attributes, exists in a particular geographic area, a PoI is generated based on attributes of the dominant AP group. The PoI once determined is used for managing security settings on a user device 12 in a geographic area corresponding to the PoI.

A request handling server 48 delivers PoI/AP data 64 to a user device 12 via the finder application 16 based on an AP list 63 showing APs (e.g., WiFi™ routers) detected by a wireless transceiver of the user device 12. The PoI/AP data 64 includes nearby PoIs, APs, AP clusters, PoI and AP attributes, and security maps based on the PoI and AP attributes. Security settings for the request handling server 48 are set by a security server 52 based on data in a security datastore 50.

Figure 2:
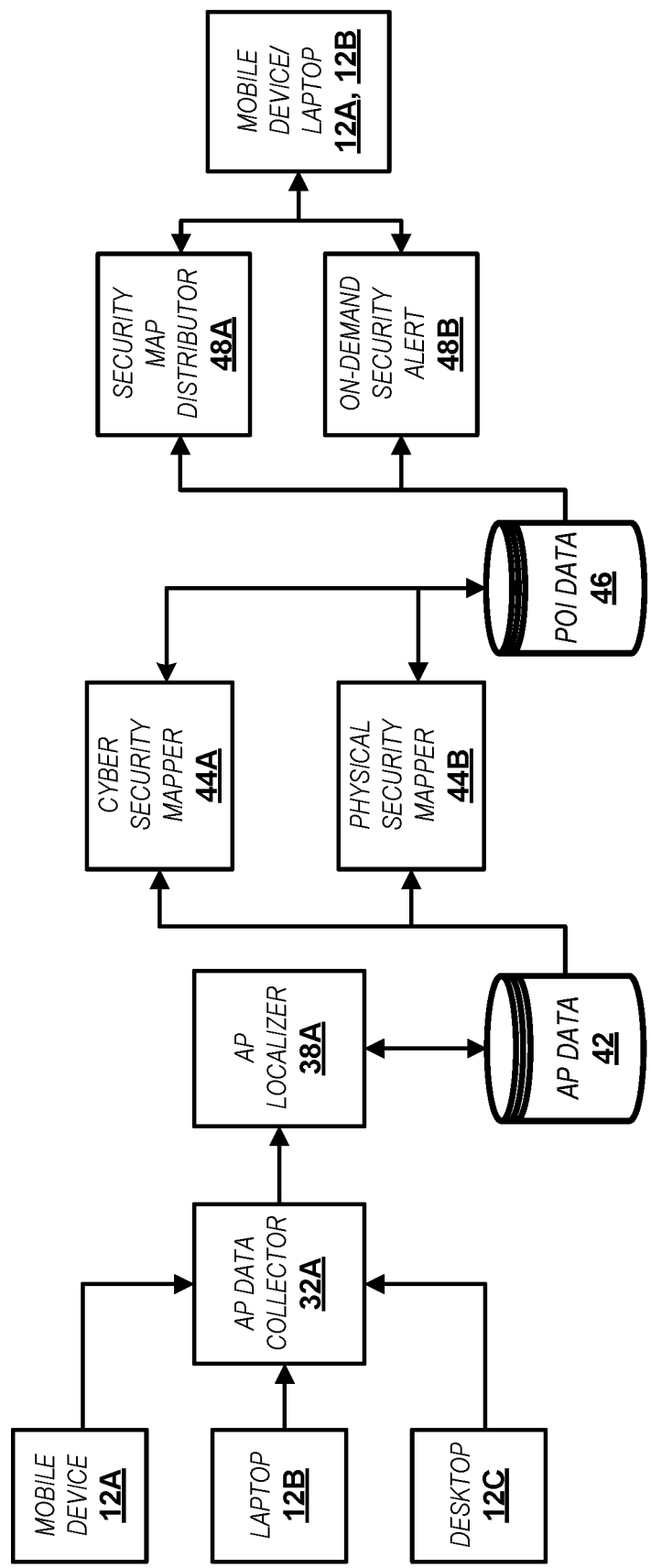
FIG. 2 is a diagram showing particular elements of the system of FIG. 1 at a lower level of abstraction.

Referring now also to FIG. 2, details of device security enabling processes performed in the network system 10 are shown by reference to particular software and/or hardware modules corresponding generally to lower levels of abstraction than the elements shown in FIG. 1. User devices 12 are represented by the mobile communication device 12A, portable laptop computer 12B, and desktop computer 12C which execute via a processor the security application 14 and finder application 16. An AP data collector 32A operates on the AP collection server 32 and collects AP data 60 from the mobile communication device 12A, laptop computer 12B, and desktop computer 12C. An AP localizer 38A forms a component of the map reducer 38 for geographically organizing the AP data which is imported to the AP datastore 42. A PoI cyber security mapper 44A forms a component of the PoI mapping application 44 and is configured to map PoIs based on their electronic security attributes (e.g., based on a comparison of wireless security protocols, connection type). A physical security mapper 44B also forms a component of the PoI mapping application 44 and is configured to map PoIs based on their physical security attributes (e.g., based on a comparison of comments, ratings, number of daily users). Electronic security and physical security mappings are stored in the PoI datastore 46. A security map distributor 48A enabled by the request handling server 48 distributes PoI security maps to a mobile communication device 12A, laptop computer 12B, or other wireless-enabled user device 12 based on a current location of the user device. The finder application 16 on the user devices 12 selectively restricts connections to nearby APs based on the PoI security maps received. Restriction is implemented by the finder application 16 for example by blocking wireless data transmission from a user device 12 or blocking wireless data reception by the user device 12. An on-demand security alert module 48B is configured to provide security alerts to the mobile communication device 12A, laptop computer 12B, or other wireless-enabled user device 12 enabling the finder application 16 based on PoI security maps and a current location of the user device 12.

Figure 3:
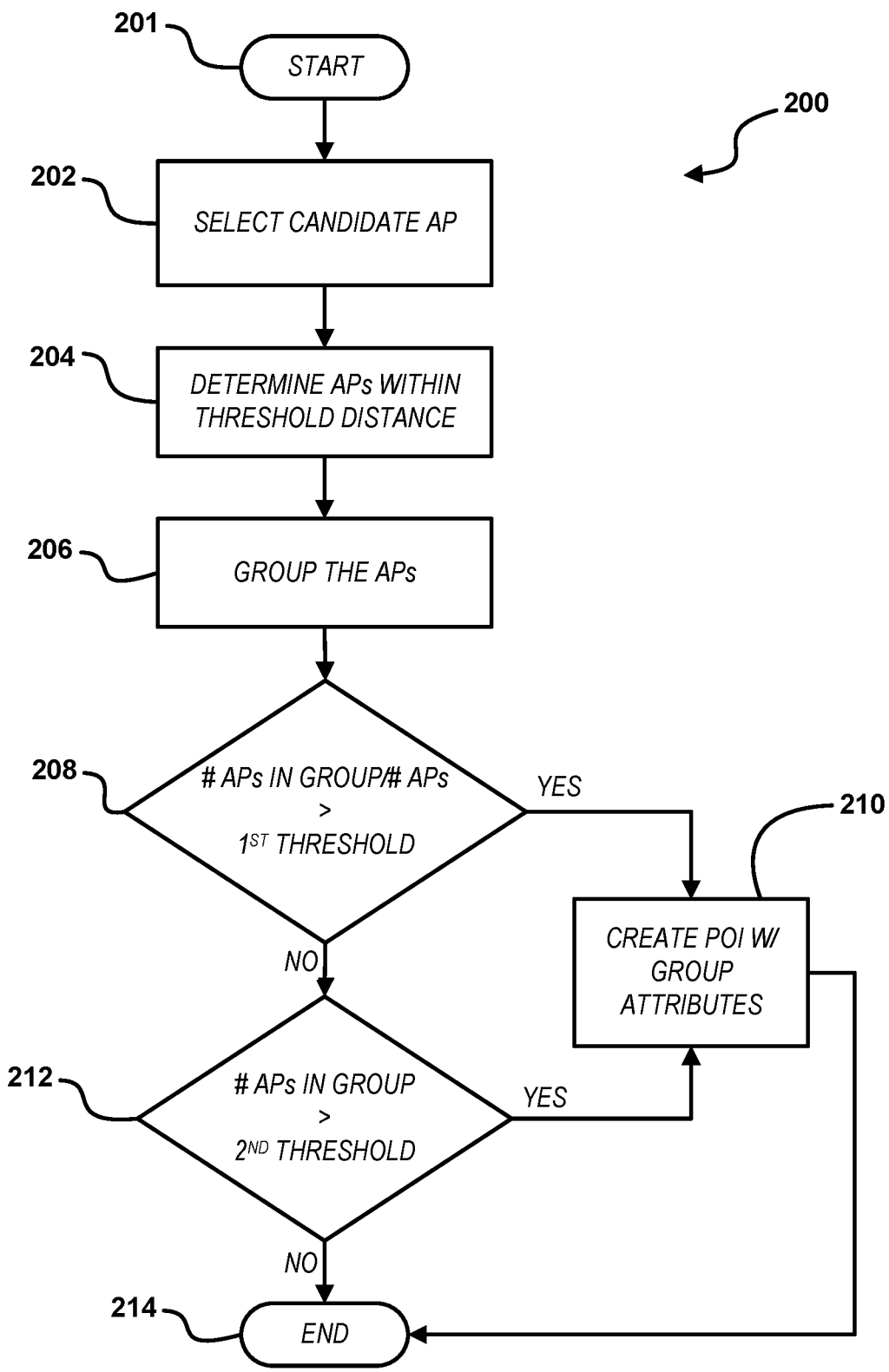
FIG. 3 is a diagram showing an illustrative method for generating a PoI based on wireless access point attributes.

Referring to FIG. 3, an illustrative method 200 is shown for generating a PoI, for example to be used in restricting a user device's connections to nearby APs and managing user device security settings. While the method 200 and associated processes are described with reference to the components shown in FIG. 1, including the user device 12, the AP server system 30, and the AP datastore 42, the method 200 may alternatively be performed via other suitable systems.

The method starts at step 201. In a step 202, candidate APs are selected based on one or more particular criteria, for example proximity to a particular geographical location. For each candidate AP in the AP datastore 42, the APs within a given distance threshold (e.g., 100 m) from the candidate AP are determined (step 204). The AP locations in the AP datastore 42 used in the determinations of step 204 can have been estimated (e.g., by the localizer 38A) for example based on locations of the user devices 12 (e.g., GPS-determined locations) and respective signal strengths of signals received from scanned APs by the user devices 12 providing the AP data 60. The attributes of the APs are compared and the APs are grouped by attributes such as attributes listed in Table 1 (e.g., similar SSID, BSSID, or # of users) to create candidate groups (step 206). In steps 208 and 212, it is determined if the candidate group is dominant. In a step 208, it is determined if the number of APs in the candidate group divided by the number of APs within the given distance from the candidate AP are greater than a first particular threshold (e.g., 0.5). In this case a lower first particular threshold (e.g., 0.3) may permit multiple PoIs in a particular geographic area. If "yes" is the determined response to the query step 208, then the candidate group is considered dominant, and in a step 210 a PoI is created based on attributes of the candidate group (e.g., location, security type, category, ratings) and the process ends (step 214). Beneficially, the geographic location of the PoI is set as the location of the candidate AP. Alternatively, the geographic location of the PoI can be set based on the locations of the APs in the group, for example a mean location of the APs in the group or weighted centroid of the locations of the APs in the group. If "no" is the determined response to the query step 208, then in a step 212, it is determined if the number of APs in the candidate group are greater than a second particular threshold (e.g., 25). If "yes" is the determined response to the query step 212, then the candidate group is considered dominant, and in a step 210 a PoI is created based on the attributes of the candidate group. If "no" is the determined response to the query step 212, the process ends in step 214 for the particular candidate AP and a PoI is not created for the particular candidate AP.

The determination of whether a candidate group is considered dominant in step 208 and step 212 can be weighted based on the number of accesses made by the user devices 12 to the APs in a particular group over a particular period of time. For example a relatively higher first threshold can be applied in step 208 for a candidate group having a relatively higher average number of device accesses to APs in the candidate group, or a relatively lower second threshold can be applied in step 212 for a candidate group having a relatively higher average number of device accesses to APs in the candidate group. In another configuration, if there are more than one candidate group in which "yes" is determined in step 208 but it is preferred that only one dominant group is designated, the candidate group having more accesses to group APs in a given time period can be deemed dominant, and a PoI can be created based on the attributes of such dominant candidate group. For example a first candidate group including ten (10) WiFi™ APs and an average of one thousand (1000) accesses per day can be designated as dominant as compared with a second candidate group including twelve (12) WiFi™ APs and an average of ten (10) accesses per day, as the first candidate group is more popular, even though the first candidate group has less APs than the second candidate group.

Figure 4:
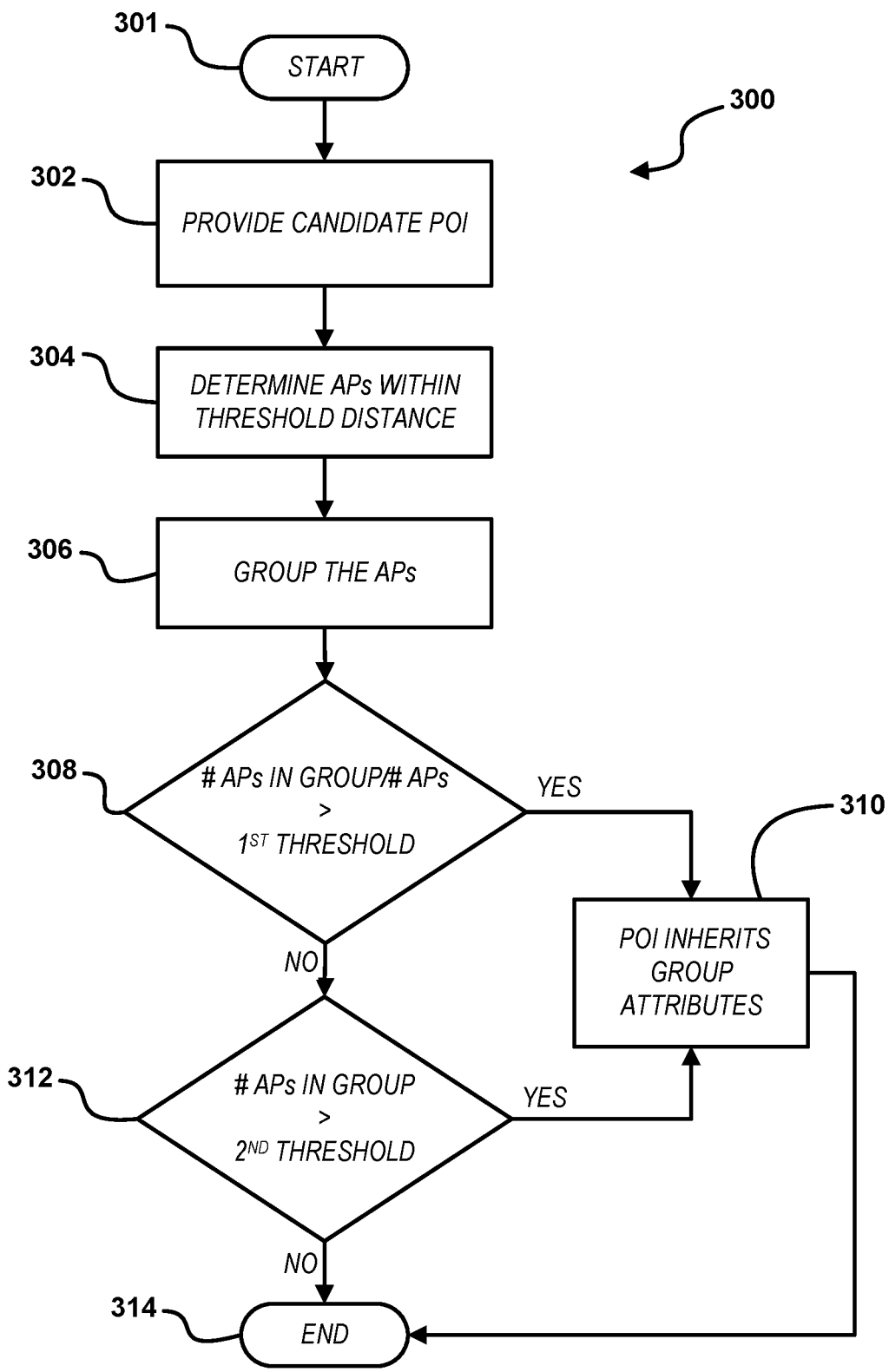
FIG. 4 is a diagram showing an illustrative method for applying attributes to pre-determined PoIs based on wireless access point attributes.

As an alternative to selecting candidate APs and then determining APs within a threshold distance from each candidate AP, PoI's locations can be pre-determined (i.e., seeded) for example based on data from an external database. Referring to FIG. 4, an illustrative method 300 for applying attributes to pre-determined PoIs is shown. While the method 300 and associated processes are described with reference to the components shown in FIG. 1, including the user device 12, the AP server system 30, and the AP datastore 42, the method 300 may alternatively be performed via other suitable systems.

The method begins at step 301. In a step 302, predetermined PoIs are provided, each including at least a geographic location, and stored for example in the PoI datastore 46. For each candidate PoI, the APs within a given distance threshold (e.g., 100m) from the candidate PoI are determined (step 304). The AP locations in the AP datastore 42 used in the determinations of step 304 can have been estimated (e.g., by the localizer 38A) for example based on locations of the user devices 12 (e.g., GPS-determined locations) and respective signal strengths of signals received from scanned APs by the user devices 12 providing the AP data 60. The APs are grouped by attributes (e.g., similar SSID, BSSID, and # of users) to create candidate groups (step 306). In steps 308 and 312, it is determined if the candidate group is dominant. In the step 308, it is determined if the number of APs in the candidate group divided by the number of APs within the given distance from the candidate AP are greater than a first particular threshold (e.g. 0.5). In this case a lower first particular threshold (e.g., 0.3) may permit multiple PoIs in a particular geographic area. If "yes" is the determined response to the query step 308, then the candidate group is considered dominant, and in a step 310 the PoI inherits the attributes of the candidate group (e.g., security type, category, ratings). Beneficially, the geographic location of the PoI remains unchanged. Alternatively, the geographic location of the PoI can be set based on the locations of the APs in the group, for example a mean location of the APs in the group or weighted centroid of the locations of the APs in the group. If "no" is the determined response to the query step 208, then in a step 312, it is determined if the number of APs in the candidate group are greater than a second particular threshold (e.g., 25). If "yes" is the determined response to the query step 312, then the candidate group is considered dominant, and in the step 310 the PoI inherits the attributes of the candidate group. If "no" is the determined response to the query step 312, the process ends (step 314) for the particular PoI, and the PoI is discarded or rendered inactive. The determination of whether a candidate group is considered dominant in step 308 and step 312 can be weighted based on the number of accesses made by the user devices 12 to the access points in a particular candidate group over a particular period of time, for example as described above with reference to the method 200 of FIG. 3.

Figure 5:
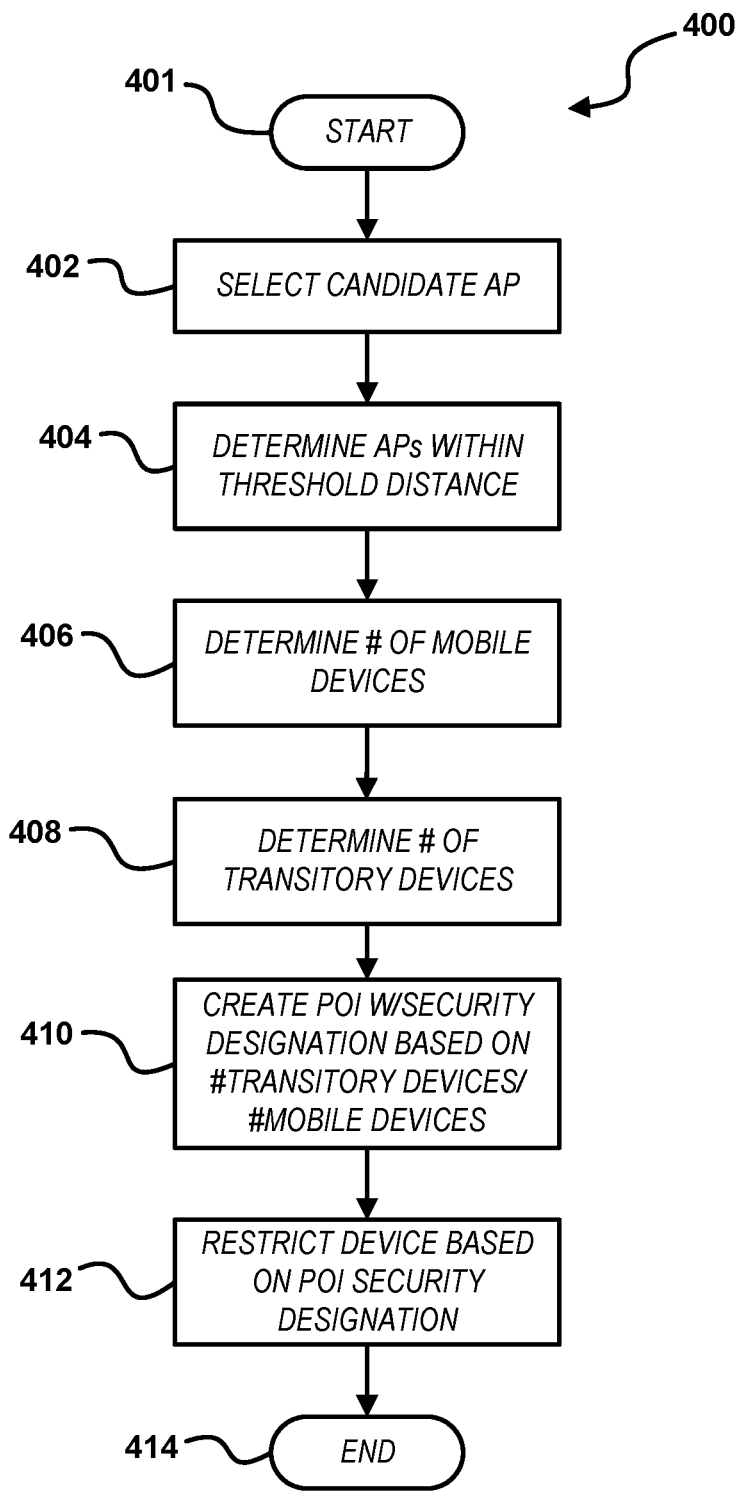
FIG. 5 is a diagram showing an illustrative method for generating PoIs including a security designation and restricting a mobile device based on the security designation.

Referring to FIG. 5, an illustrative method 400 is shown for generating PoIs and applying wireless security setting based on generated PoIs, for example to be used in restricting connections by wireless communication devices to nearby APs and managing wireless communication device security settings. While the method 400 and associated processes are described with reference to the components shown in FIG. 1, including the user device 12, the AP server system 30, and the AP datastore 42, the method 400 may alternatively be performed via other suitable systems.

The method starts at a step 401, and in a step 402, candidate APs are selected based on one or more particular criteria, for example proximity to a particular geographical location. For each candidate AP from the AP datastore 42, all APs within a given distance threshold (e.g., 100 m) from the candidate AP ("AP candidate group") are determined (step 404). The AP locations in the AP datastore 42 used in the determinations of step 404 can have been estimated (e.g., by the localizer 38A) for example based on locations of the user devices 12 (e.g., GPS-determined locations) and respective signal strengths of signals received from scanned APs by the user devices 12 providing the AP data 60 (e.g., by triangulation). In step 406, a total number of mobile communication devices that connected to the APs in the candidate group within a first time period (e.g., 30 days) is determined. In a step 408, it is determined the number of the mobile communication devices (e.g., wireless user devices 12 and other devices) that connected to the APs within the threshold distance of the candidate AP (e.g., the candidate APs) and that have not connected for more than a second time period (e.g., 15 days) for more than a particular duration (e.g., 2 hours per day), hereinafter "transitory devices". In step 410, a PoI is created including a security designation based at least on the number of transitory devices over the total number of mobile communication devices connected to the APs within the distance threshold of the candidate AP. Wireless communication of a user device 12 located at or near the PoI is restricted by the finder application 16 based on the security designation (step 412) for example requiring or enabling a particular authentication process when connecting to an AP within the threshold distance from the PoI. The particular authentication process can implement for example one or more of passcode authentication, face recognition authentication, fingerprint authentication, voice recognition authentication. Beneficially, the geographic location of the PoI is set as the location of the candidate AP. Alternatively, the geographic location of the PoI can be set based on the locations of the APs in the group, for example a mean location of the APs in the group or weighted centroid of the locations of the APs in the group. The method ends at step 414.

Referring to Table 2 below, an exemplary manner of allocating PoI attributes according to step 410 of method 400 is shown where "n" equals the number of mobile communication devices connected to the APs within the distance threshold of the candidate AP, and "r" equals the number of transitory devices over the total number of mobile communication devices that have connected to the APs over a particular time period. The attributes shown are "stationary private" suggesting potentially privately-available APs, "stationary public" suggesting potentially publicly-available APs, and "transitory" suggesting publicly-available APs with high user-turnover.

TABLE 2

| POI TYPE | $r < 0.3$ | $0.3 \leq r < 0.6$ | $0.6 \leq r$ |
| --- | --- | --- | --- |
| $n \leq 10$ | Stationary private | Stationary public | Transitory |
| $10 < n \leq 100$ | Stationary public | Stationary public | Transitory |
| $100 < n$ | Stationary public | Transitory | Transitory |

For example, as indicated in Table 2, when the total number of mobile communication devices that connected to the APs within the distance threshold of the candidate AP during a particular week is less than 10 and the number of transitory devices during that week over the total number of mobile communication devices is less than 0.3, the PoI is designated as "stationary private". Referring to Table 3, security policies are applied by the finder application 16 based on attributes of the PoI at or near the geographic location of the user device 12, for example as determined by a location determining system of the user device 12 (e.g., a Global Positioning System).

TABLE 3

| POI TYPE | EXAMPLE LOCATIONS | EXAMPLE SECURITY POLICIES |
|---|---|---|
| Stationary private | Personal residence | No password or single password |
| Stationary public | Office, school | Single password |
| Transitory | Train station, airport | Two or more passwords (e.g., passcode + fingerprint) Or single password with short password expiration time (e.g., 30 minutes) |

For example, if a particular PoI where a user device 12 is located is classified as "transitory", the finder application 16 via the operating system of the user device 12 can initiate a lock to prevent network connections to APs within a threshold distance of the PoI unless the security policy for transitory PoIs is complied with, for example two or more passwords are entered by a user of the user device 12.

PoIs, for example as determined in the methods described above, can be characterized based on the similar or matching attributes of the APs in the candidate group. For example if the APs in a particular candidate AP group share a particular school name (e.g., "Polk High-cafeteria" and "Polk High-library") in the SSIDs and a large number of connected devices, then a new PoI can be created with attributes for example of: [type=public, subtype=school, name="Polk High", location=mean (locations of candidate group), radius=stddev (spread of locations of candidate group)].

In another example, if only one (1) AP is in an area with 2 connected user devices in total and heavier traffic at night, the location is most likely a personal residence. Thus, a new PoI can be created with attributes of: [type=private, subtype=home, location=AP location, radius=50 meters (typical AP coverage radius)].

In another example, if two (2) APs with high traffic during lunch/dinner time with duration of an average thirty (30) minutes at lunch and one (1) hour at dinner are in particular area, the area may be a restaurant. Thus, a new PoI can have attributes of: [type=public, subtype=restaurant, location=AP location, radius=100 m (typical coverage radius of two APs)].

A further example includes use of a BSSID ("MAC address"). The first half of the MAC address identifies a vendor of the hardware and in many cases can indicate what type of user device 12 is connecting (e.g., Android™ mobile device, Macbook™ laptop computer). A PoI type can be identified based on devices on a particular network. A connection by a Sony™ Playstation™ computer game console at a particular location may indicate a personal residence rather than a theater or grocery store. Unavailability of any desktop computer may lower the likelihood that a PoI is a personal residence.

Figure 6:
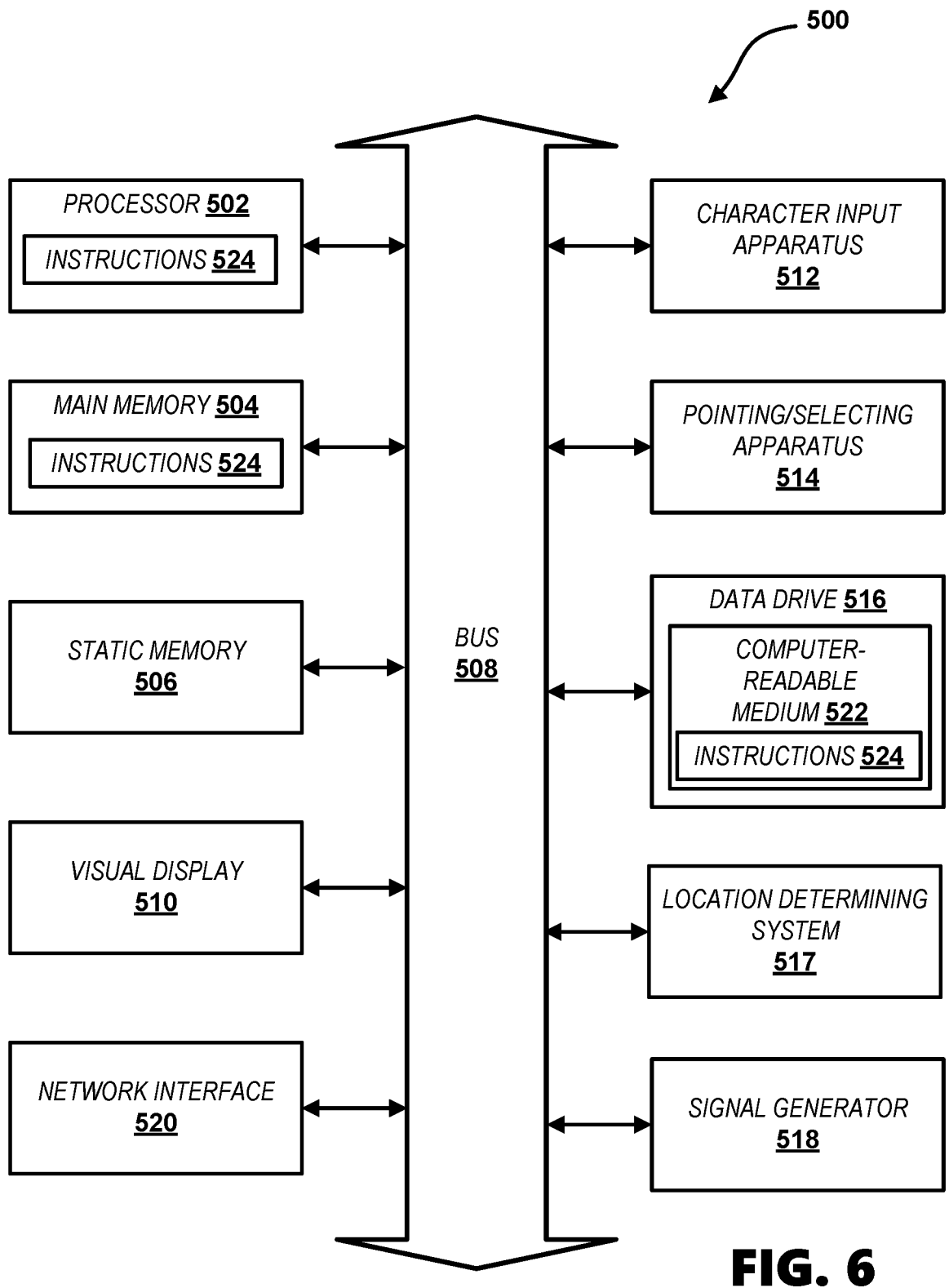
FIG. 6 is a diagram showing an illustrative computer system for performing described methods according to the illustrative embodiments.

FIG. 6 illustrates in abstract the function of an exemplary computer system 500 on which the systems, methods and processes described herein can execute. For example, the user device 12 and AP server system 30, and servers included therein, can each be embodied by a particular computer system 500. The computer system 500 may be provided in the form of a personal computer, laptop, handheld mobile communication device, mainframe, distributed computing system, or other suitable configuration. Illustrative subject matter is in some instances described herein as computer-executable instructions, for example in the form of program modules, which program modules can include programs, routines, objects, data structures, components, or architecture configured to perform particular tasks or implement particular abstract data types. The computer-executable instructions are represented for example by instructions 524 executable by the computer system 500.

The computer system 500 can operate as a standalone device or can be connected (e.g., networked) to other machines. In a networked deployment, the computer system 500 may operate in the capacity of a server or a client machine in server-client network environment, or as a peer machine in a peer-to-peer (or distributed) network environment. The computer system 500 can also be considered to include a collection of machines that individually or jointly execute a set (or multiple sets) of instructions to perform one or more of the methodologies described herein.

It would be understood by those skilled in the art that other computer systems including but not limited to networkable personal computers, minicomputers, mainframe computers, handheld mobile communication devices, multiprocessor systems, microprocessor-based or programmable electronics, and smart phones could be used to enable the systems, methods and processes described herein. Such computer systems can moreover be configured as distributed computer environments where program modules are enabled and tasks are performed by processing devices linked through a communications network, and in which program modules can be located in both local and remote memory storage devices.

The exemplary computer system 500 includes a processor 502, for example a central processing unit (CPU) or a graphics processing unit (GPU), a main memory 504, and a static memory 506 in communication via a bus 508. A visual display 510 for example a liquid crystal display (LCD), light emitting diode (LED) display or a cathode ray tube (CRT) is provided for displaying data to a user of the system. The visual display 510 can be enabled to receive data input from a user for example via a resistive or capacitive touch screen. A character input apparatus 512 can be provided for example in the form of a physical keyboard, or alternatively, a program module which enables a user interactive simulated keyboard on the visual display 510 and actuatable for example using a resistive or capacitive touchscreen. A pointing/selecting apparatus 514 can be provided, for example in the form of a computer mouse or enabled via a resistive or capacitive touch screen in the visual display 510. A data drive 516, a signal generator 518 such as an audio speaker, and a network interface 520 configured for wireless or wired communication can also be provided. A location determining system 517 is also provided which can include for example a GPS receiver and supporting hardware.

The instructions 524 and data structures embodying or used by the herein-described systems, methods, and processes, for example software instructions, are stored on computer-readable medium 522 and are accessible via the data drive 516. Further, the instructions 524 can completely or partially reside for a particular time period in the main memory 504 or within the processor 502 when the instructions 524 are executed. The main memory 504 and the processor 502 are also as such considered computer-readable media.

While the computer-readable medium 522 is shown as a single medium, the computer-readable medium 522 can be considered to include a single medium or multiple media, for example in a centralized or distributed database, or associated caches and servers, that store the instructions 524. The computer-readable medium 522 can be considered to include any tangible medium that can store, encode, or carry instructions for execution by a machine and that cause the machine to perform any one or more of the methodologies described herein, or that can store, encode, or carry data structures used by or associated with such instructions. Further, the term "computer-readable storage medium" can be considered to include, but is not limited to, solid-state memories and optical and magnetic media that can store information in a non-transitory manner. Computer-readable media can for example include non-volatile memory such as semiconductor memory devices (e.g., magnetic disks such as internal hard disks and removable disks, magneto-optical disks, and CD-ROM and DVD-ROM disks, Erasable Programmable Read-Only Memory (EPROM), Electrically Erasable Programmable Read-Only Memory (EEPROM), and flash memory devices).

The instructions 524 can be transmitted or received over a communications network, for example the communications network 8, using a signal transmission medium via the network interface 520 operating under one or more known transfer protocols for example, FTP, HTTP, or HTTPs. Examples of communication networks include a local area network (LAN), a wide area network (WAN), the Internet, mobile telephone networks, Plain Old Telephone (POTS) networks, and wireless data networks for example, WiFi™ and 3G/4G/5G cellular networks. The term "computer-readable signal medium" can further be considered to include any transitory intangible medium that is capable of storing, encoding, or carrying instructions for execution by a machine, and includes digital or analog communications signals or other intangible medium to facilitate communication of such instructions.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A method implemented by one or more processors, the method comprising:
   scanning wirelessly by a plurality of mobile devices;
   selecting a plurality of wireless access points based on the scanning by the plurality of mobile devices;
   determining particular attributes of the plurality of wireless access points;
   comparing the particular attributes of the plurality of wireless access points;
   grouping a particular set of the plurality of wireless access points based on the comparing of the particular attributes;
   assigning a particular geographic location to the particular set of the plurality of wireless access points;
   assigning a particular security protocol to the particular geographic location based on the particular attributes of the particular set of the plurality of wireless access points;
   determining that a particular mobile device is positioned within a particular distance of the particular geographic location; and
   restricting wireless communication of the particular mobile device based on the particular security protocol assigned to the particular geographic location.

2. The method of claim 1, the particular attributes comprising positions of the plurality of wireless access points, the method further comprising assigning the particular geographic location to the particular set of the plurality of wireless access points based on the positions of the plurality of wireless access points of the particular set of the plurality of wireless access points.

3. The method of claim 2, wherein the particular attributes comprise locations of the plurality of mobile devices where signals from the plurality of the wireless access points were received by the plurality of mobile devices, the method further comprising:
   estimating positions of the plurality of wireless access points based on the locations of the plurality of mobile devices where the signals from the plurality of wireless access points were received by the plurality of mobile devices; and
   determining the particular geographic location as at least one of a weighted centroid or a mean location of the positions of the plurality of wireless access points of the particular set of the plurality of wireless access points.

4. The method of claim 1, further comprising:
   assigning certain attributes to the particular geographic location based on the particular attributes of the particular set of the plurality of wireless access points; and
   assigning the particular security protocol to the particular geographic location based on the certain attributes of the particular geographic location.

5. The method of claim 4, further comprising:
   populating a first data structure accessible via a network with the particular attributes of the plurality of wireless access points; and
   populating a second data structure accessible via the network with the certain attributes of the particular geographic location.

6. The method of claim 1, further comprising:
   determining matching attributes of the particular attributes of the plurality of wireless access points;
   grouping the particular set of the wireless access points based on the determining of the matching attributes; and
   assigning the particular geographic location to the particular set of the wireless access points based on the number of wireless access points in the particular set relative to the number of wireless access points within the particular distance of the particular geographic location.

7. The method of claim 1, further comprising:
   determining matching attributes of the particular attributes of the plurality of wireless access points;
   grouping the particular set of the wireless access points based on the determining of the matching attributes; and
   assigning the particular geographic location to the particular set of the wireless access points based on the number of wireless access points in the particular set divided by the number of wireless access points within the particular distance of the particular geographic location exceeding a particular threshold.

8. The method of claim 1, further comprising:
   determining matching attributes of the particular attributes of the plurality of wireless access points;

grouping the particular set of the wireless access points based on the determining of the matching attributes; and assigning the particular geographic location to the particular set of the wireless access points based on the number of wireless access points in the particular set exceeding a particular threshold.

9. The method of claim 1, wherein the particular attributes comprise locations of the plurality of mobile devices where signals from the plurality of the wireless access points were received by the plurality of mobile devices and received strengths of the signals received from the plurality of wireless access points by the plurality of mobile devices, the method further comprising:

estimating positions of the plurality of wireless access points based at least on the locations of the plurality of mobile devices where the signals from the wireless access points were received and the received strengths of the signals received from the wireless access points by the plurality of mobile devices; and determining the particular geographic location based on the estimated positions of the particular set of the wireless access points.

10. The method of claim 1, further comprising:

determining a number of device accesses by the plurality of mobile devices to the particular set of the wireless access points; and assigning the particular geographic location to the particular set of the wireless access points based on the number of device accesses.

11. The method of claim 1, the restricting of the wireless communication comprising blocking at least one of wireless data transmission from the particular mobile device and wireless data reception by the particular mobile device.

12. The method of claim 1, the restricting of the wireless communication comprising restricting connection by the particular mobile device to a particular wireless access point of the particular set of the plurality of wireless access points.

13. The method of claim 1, the restricting of the wireless communication comprising executing a particular authentication process on the particular mobile device to permit connection by the particular mobile device to a particular wireless access point of the particular set of the plurality of wireless access points.

14. The method of claim 1, the restricting of the wireless communication comprising restricting by an application executed on the particular mobile device a connection by the particular mobile device to a particular wireless access point of the particular set of the plurality of wireless access points.

15. The method of claim 14, further comprising generating an alert on the particular mobile device based on the particular security protocol assigned to the particular geographic location.

16. The method of claim 1, further comprising:

selecting a candidate access point based on at least one predetermined criterion;

determining distances of the plurality of wireless access points from the candidate access point based on the scanning for signals by the plurality of mobile devices; and selecting the plurality of wireless access points based on the distances of the plurality of wireless access points from the candidate access point.

17. The method of claim 16, further comprising assigning the particular geographic location to the particular set of the plurality of wireless access points as a geographic position of the candidate access point.

18. The method of claim 16, the particular attributes comprising locations of the plurality of mobile devices where signals from the wireless access points were received and received strengths of the signals received from the wireless access points, the method further comprising:

estimating positions of the plurality of wireless access points based at least on the locations of the plurality of mobile devices where the signals from the wireless access points were received and the received strengths of the signals received from the plurality of wireless access points by the plurality of mobile devices;

determining at least one of a mean location of the particular set of the plurality of wireless access points or a weighted centroid location of the particular set of the plurality of wireless access points; and assigning the particular geographic location to the particular set of the plurality of wireless access points as the at least one of the mean location of the particular set of the plurality of wireless access points or the weighted centroid location of the particular set of the plurality of wireless access points.

19. The method of claim 16, the at least one predetermined criterion comprising a geographic constraint.

20. The method of claim 16, further comprising selecting the plurality of wireless access points based on the distances of the plurality of wireless access points from the candidate access point being within a threshold.

21. The method of claim 1, the particular geographic location comprising a geographic point of interest.

22. The method of claim 1, further comprising:

designating a geographic point of interest;

determining distances of the plurality of wireless access points from the geographic point of interest based on the scanning for signals by the plurality of mobile devices; and selecting the plurality of wireless access points based on the distances of the plurality of wireless access points from the geographic point of interest.

23. The method of claim 22, further comprising assigning the particular geographic location to the particular set of the plurality of wireless access points as the geographic point of interest.

24. The method of claim 22, further comprising:

determining at least one of a mean location of the particular set of the plurality of wireless access points or a weighted centroid location of the particular set of the plurality of wireless access points; and assigning the particular geographic location to the particular set of the plurality of wireless access points as the at least one of the mean location of the particular set of the plurality of wireless access points or the weighted centroid location of the particular set of the plurality of wireless access points.

25. The method of claim 1, wherein the particular attributes comprise at least one of service set identifiers ("SSIDs") or basic service set identifications ("BSSIDs"), the method further comprising:

comparing the at least one of the SSIDs or the BSSIDs of the plurality of wireless access points; and grouping the particular set of the plurality of wireless access points based on the comparing of the at least one of the SSIDs or the BSSIDs.

26. The method of claim 1, wherein the particular attributes comprise a number of the plurality of mobile devices that connected to each of the plurality of wireless access points, the method further comprising:

comparing the number of the plurality of mobile devices that connected to each of the plurality of wireless access points; and grouping the particular set of the plurality of wireless access points based on the comparing of the number of the plurality of mobile devices that connected to each of the plurality of wireless access points.

27. The method of claim 1, wherein the particular attributes comprise security protocols, the method comprising:

comparing the security protocols of the plurality of wireless access points; and grouping the particular set of the plurality of wireless access points based on the comparing of the security protocols of the plurality of wireless access points.

28. The method of claim 1, further comprising:

determining durations of time that the plurality of mobile devices connected to the plurality of wireless access points over a particular period time period; and grouping the particular set of the plurality of wireless access points based on the durations of time that the plurality of mobile devices connected to the plurality of wireless access points over the particular period time period.

29. The method of claim 28, further comprising:

designating as transitory devices ones of the plurality of mobile devices that connected to the plurality of wireless access points less than a threshold duration over the particular time period; and grouping the particular set of the plurality of wireless access points based on the number of transitory devices relative to the number of the plurality of mobile devices that connected to the plurality of wireless access points over the particular time period.

30. A method of implementing security protocols on a mobile communication device, the method comprising:

designating a particular geographic area;

scanning wirelessly by a plurality of mobile devices to locate a plurality of wireless access points in the particular geographic area;

determining a number of the plurality of mobile devices that connect to one or more of the plurality of wireless access points in the particular geographic area over a particular time period;

determining durations of time the plurality of mobile devices connect to the one or more of the plurality of wireless access points in the particular geographic area over the particular time period;

designating a particular geographic location in the particular geographic area;

assigning a particular security protocol to the particular geographic location based at least on the durations of time the plurality of mobile devices connect to the one or more of the plurality of wireless access points in the particular geographic area and the number of the plurality of mobile devices that connect to the one or more of the plurality of wireless access points in the particular geographic area;

determining by a particular mobile device that the particular mobile device is located within a particular distance of the particular geographic location; and applying the particular security protocol by the particular mobile device based on the particular mobile device being located within the particular distance of the particular geographic location.

31. The method of claim 30, further comprising designating a candidate access point based on at least one criterion; and defining the particular geographic area by a radius extending from a position of the candidate access point.

32. The method of claim 31, further comprising designating the particular geographic location as the position of the candidate access point.

33. The method of claim 30, further comprising determining the particular geographic location as at least one of a weighted centroid or a mean location of the positions of the plurality of wireless access points.

34. The method of claim 30, further comprising connecting by the particular mobile device to a particular wireless access point in the particular geographic area by implementing a particular authentication process based on the particular security protocol assigned to the particular geographic location.

35. The method of claim 30, further comprising:

determining when the durations of time are less than a particular threshold duration; and assigning the particular security protocol to the particular geographic location further based on the determining of when the durations of time are less than the particular threshold duration.

36. The method of claim 35, further comprising:

designating as transitory devices ones of the plurality of mobile devices which connect to the one or more of the plurality of wireless access points for less than the particular threshold duration; and assigning the particular security protocol to the particular geographic location further based on the number of the transitory devices relative to the number of the plurality of mobile devices that connect to the one or more of the plurality of wireless access points in the particular geographic area over the particular time period.

37. The method of claim 35, further comprising:

designating as transitory devices ones of the plurality of mobile devices which connect to the one or more of the plurality of wireless access points less than a particular threshold duration during less than a particular threshold number of days during the particular time period; and assigning the particular security protocol to the particular geographic location further based on the number of the transitory devices relative to the number of the plurality of mobile devices that connect to the one or more of the plurality of wireless access points in the particular geographic area over the particular time period.

38. The method of claim 30, wherein determining the particular mobile device is located within the particular distance of the particular geographic location comprises determining the particular mobile device is located in the particular geographic area.

39. The method of claim 30, further comprising:

determining by the scanning positions of the plurality of wireless access points; and determining the particular geographic location as at least one of a weighted centroid or a mean location of the positions of the plurality of wireless access points.

40. A security system for a wireless network, the security system comprising:

a plurality of mobile devices comprising processors and wireless hardware which enable a particular mobile device of the plurality of mobile devices to:

wirelessly scan to locate a plurality of wireless access points;

determine particular attributes of the plurality of wireless access points, the particular attributes comprising service set identifiers ("SSIDs"), positions of the plurality of wireless access points, and security protocols of signals from the plurality of wireless access points;

determine a position of the particular mobile device;

execute a particular authentication process on the particular mobile device to permit connection by the particular mobile device to a particular wireless access point based on a particular security protocol associated with the position of the particular mobile device; and transmit the particular attributes of the plurality of wireless access points; and at least one server comprising at least one processing element which enables the at least one server to:

receive the particular attributes of the plurality of wireless access points from the plurality of mobile devices;

compare the particular attributes of the plurality of wireless access points;

group a particular set of the plurality of wireless access points based on the comparing of the particular attributes;

assign a particular geographic location to the particular set of the plurality of wireless access points; and assign the particular security protocol to the particular geographic location based on the particular attributes of the particular set of the plurality of wireless access points.

* * * * *